No. 782,514. PATENTED FEB. 14, 1905.
C. A. MUDGE.
ELECTRIC BRAKING SYSTEM.
APPLICATION FILED FEB. 2, 1904.

2 SHEETS—SHEET 1.

WITNESSES:
W. Lee Helm
Daisy Taylor

INVENTOR:
Charles A. Mudge
By Mueller Bailey
his ATTORNEY.

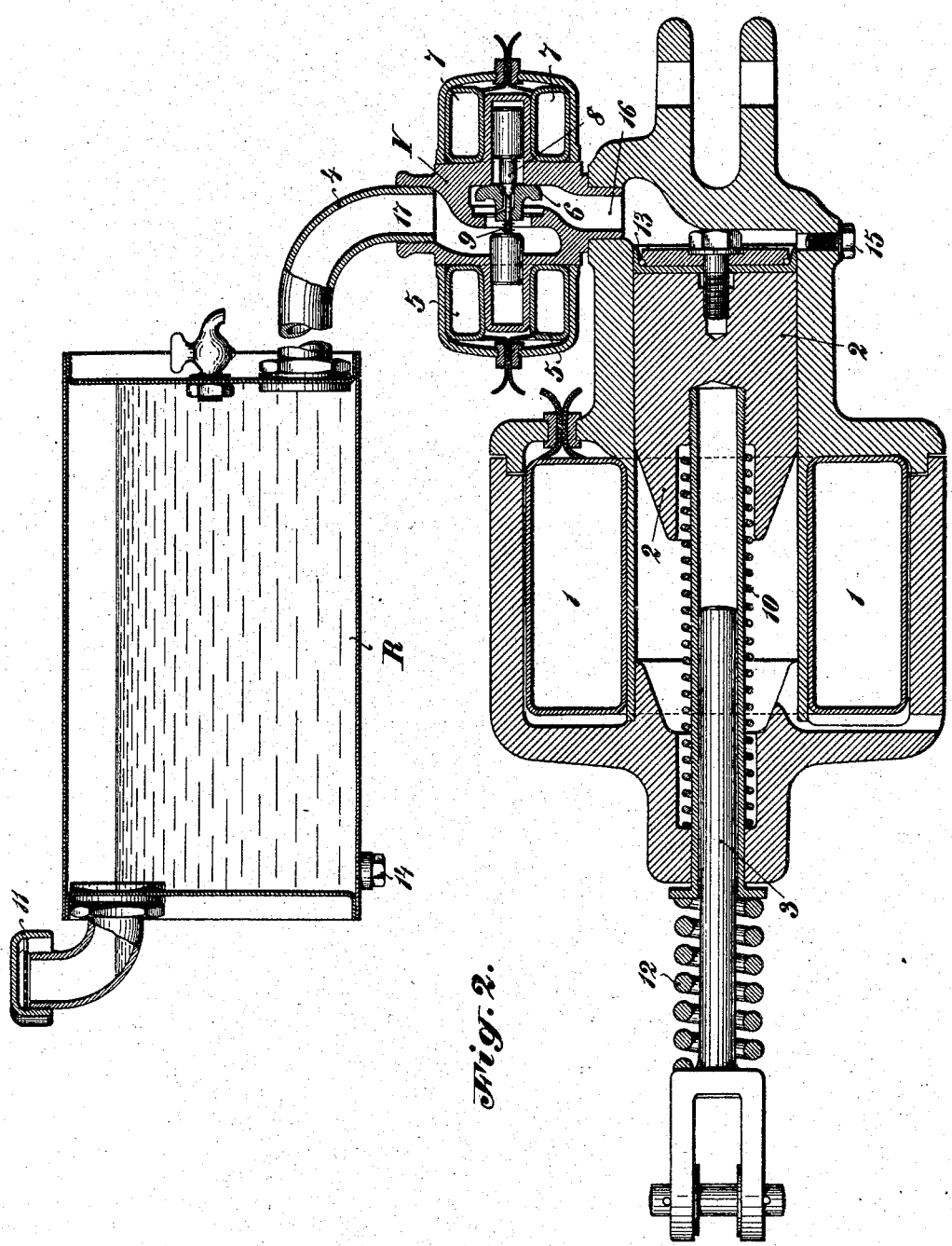

No. 782,514. Patented February 14, 1905.

UNITED STATES PATENT OFFICE.

CHARLES A. MUDGE, OF BERLIN, GERMANY.

ELECTRIC BRAKING SYSTEM.

SPECIFICATION forming part of Letters Patent No. 782,514, dated February 14, 1905.

Application filed February 2, 1904. Serial No. 191,667.

*To all whom it may concern:*

Be it known that I, CHARLES A. MUDGE, a citizen of the United States, whose residence is No. 107 Brunnenstrasse, Berlin, Prussia, German Empire, have invented new and useful Improvements in Electric Braking Systems, of which the following is a specification.

The principal feature of my invention is a form of electric brake of the solenoid type in which are certain devices for retaining the brake-pressure after all current is cut off from the brake, which pressure can be continued for any length of time without recourse to a fresh supply of energy and can be gradually or momentarily released at the will of the operator. The brake is adapted primarily to be used on railway-cars being operated by trolley, battery, or any source of current-supply; but it can also be arranged for use with elevators, hoists, cranes, &c.—in fact, where any form of power-brake is desired. The initial pressure against the wheel-shoes, track, or friction-disks can be adjusted for any value up to the maximum of the particular type of brake used by simply regulating the amount of current flowing through the brake. The form of the magnetic circuit is such as to produce a practically constant pressure for a constant current-supply no matter in what position of the stroke the piston may be. This is a decided advantage over most forms of solenoid-brakes used for traction purposes, as they generally give a pressure value rapidly increasing as the piston approaches the end of its stroke, making it almost impossible to adjust the brake-pressure for the service desired as the brake-shoes wear off.

In a simple method of obtaining any desired brake-pressure and of continuing it for any length of time without the constant expenditure of energy, combined with the possibility of gradually or momentarily decreasing the pressure at the will of the operator, I obtain all the desirable features for an ideal braking system.

The invention is illustrated by the accompanying drawings, of which—

Figure 1:
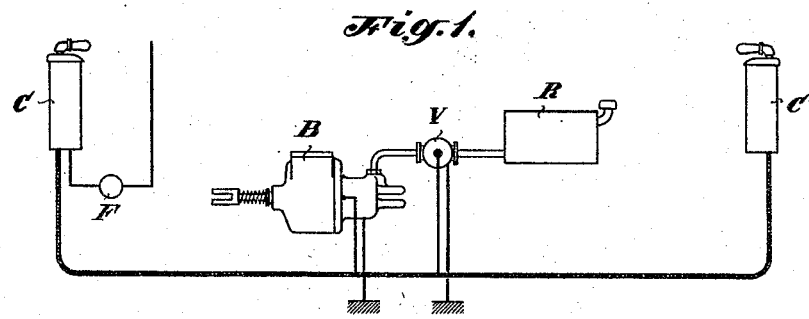
Figure 3:
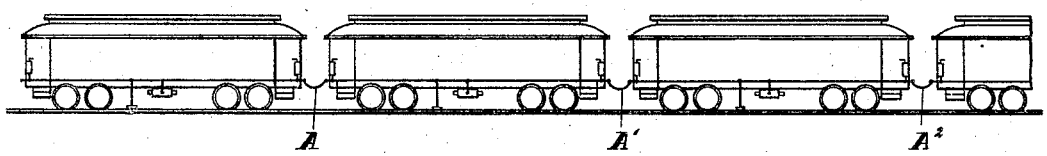
Figure 4:
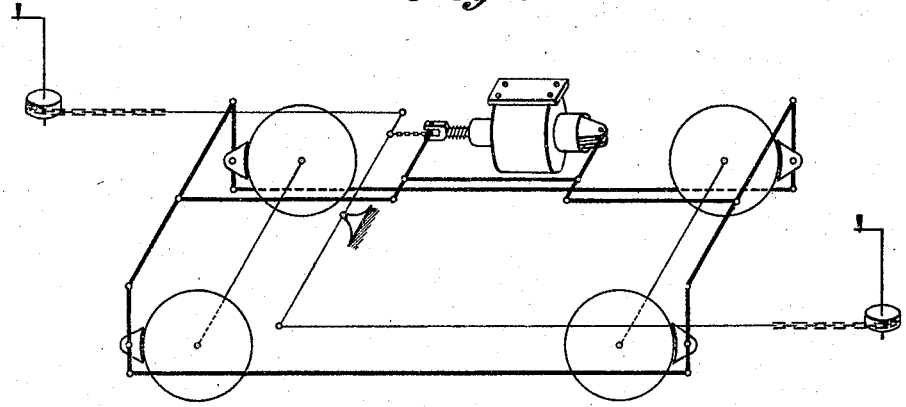

Figure 1 is a diagram of the general arrangement of brake on the car. Fig. 2 shows a section of the brake. Fig. 3 illustrates a train provided with the new brake. Fig. 4 is a perspective view of the brake mechanism as applied to a car.

In order to understand the main principle in the operation of this system, I will describe the equipment arranged for use in combination with the ordinary hand-brake operating through brake-shoes against the wheels of a railway-car. The energy for the operation of this equipment we will assume as coming from the trolley-line and the car an ordinary streetcar. There is necessary the following apparatus for the complete equipment, (see Fig. 1:) two brake-controllers C C', one on each platform of the car, a fuse F, and a brake consisting of the solenoid B, the valve V, and the reservoir R, with the pipe and cable attachments. A regulating resistance is built in the controller and is so arranged that any amount of current desired can be obtained up to the maximum calculated for the particular brake which constitutes the emergency-stop. For the case in question we find it only advisable to use two steps—one for ordinary stops, taking about fifty per cent. of the current used on the second stop, which is used only in case of emergency. The handle of the controller is turned clockwise through forty-five degrees, which admits current to the main brake-coil 1, Fig. 2. This moves the piston 2, with its connection-rod 3, forward and through the lever-arms—such, for instance, as shown in Fig. 4—sets the brake-shoes against the wheels. The space previously occupied by the piston 2 in the meantime has filled with a liquid which is held in the reservoir R and flows through the pipe 4 and valve V. The controller-handle is turned ten degrees farther, which admits current to the coil 5, closing the valve 6. The controller-handle is then returned to the off position, all current connections are interrupted, the piston 2 is unable to return to its original position, being held by the liquid, and thus the braking effect is retained with no expenditure of energy necessary. The time occupied in setting the brake is about two seconds, during which time only is energy required. To release the brake gradually, the controller-handle is turned counter-clockwise through forty-five degrees, which admits current to coil 7, opening the small valve 8, which allows the liquid to gradually escape back to the reservoir R through the small opening in the main valve 6, and thus gradually allow the piston 2 to return to any intermediate position between the maximum and the zero braking position, being determined by the length of time the current is kept on the coil 7, holding the valve 8 open. After the pressure against the main valve 6 has decreased to a predetermined amount the small spring 9 forces it open to the position shown in Fig. 2, when the spring 10 returns the piston 2 to its original or starting position, forcing the liquid back into the reservoir R, and the cycle is completed. To release the brake momentarily, the controller-handle is turned ten degress farther than the gradual-release position, which admits more current to coil 7 and opens the large valve 6, the piston 2 returning immediately to the position shown in Fig. 2.

The valve V can be attached to the brake, as shown in the cut, or can be connected to it by pipe. The reservoir R, containing the liquid for locking the brake, which is preferably a mixture of water and glycerin or any other suitable non-freezing liquid, (water alone being sufficient when the temperature is not below freezing,) can be placed in any desirable position under the car-body or, better still, when possible, under the seats.

The spring 12 is used to give elasticity to the piston-rod 3, as well as to take up any lost motion due to the piston 2 sinking back after the current is cut off, caused by the compressing of any air which may happen to be between it and the main valve 6 or the leather washer 13 not being tight.

For the purpose of cleaning reservoir R or the brake-cylinder screw-bolts 14 and 15 are provided, which upon being removed allows water or air to run through from opening 11, cleaning all reservoirs, piping, and valves liable to collect any dirt during the operation of the brake. An emergency release is made through an ordinary cock turned by hand in the valve V, allowing a direct connection between the pipe 16 and 17 if the valve 6 for any reason should become inoperative, thus allowing the brake to be released.

Any number of these brakes can be connected together so as to operate simultaneously on a train through a single controller. In this case the current is led from one car to the next through couplings A A' A², &c., Fig. 3. When each car has its separate current-collecting device and can be used as a unit by itself, the brakes can be applied for the whole train in any car of the train, which is a desirable feature in case of an emergency.

An arrangement is also provided for automatically setting the brakes in case the train should be accidentally broken apart. This is done by a simple mechanical arrangement attached to the cable-couplers, which opens a switch if the couplers are not properly removed.

This system lends itself admirably for multiple-unit service, being simple in its installation and operation, all the brakes used working in synchronism, so that the pressure can be gradually released as the train speed becomes less and the coefficient of friction greater, the degree of retardation being in full control of the operator.

What I claim, and desire to secure by Letters Patent of the United States of America, is—

1. In an electric brake, the combination with an electromagnet, of braking devices connected to it, of hydraulic means for continuing the brake-pressure after the current is cut off and electric means for gradually or instantaneously releasing the pressure, substantially as described.

2. In an electric brake, the combination with an electromagnet, a brake-shoe connected to it, of hydraulic means for locking the brake, of hydraulic means for releasing and electric devices and valves for controlling said hydraulic means, substantially as described.

3. In an electric brake, the combination with an electromagnet, a brake-shoe connected to it, means for exerting practically constant pressure, of hydraulic means for locking the brake and hydraulic means for releasing and electric devices and valves for controlling said hydraulic means, substantially as described.

4. In an electric brake the combination with an electromagnet, a brake connected to it, of a main and an auxiliary piston, electric devices and valves for controlling said pistons and means for allowing the fluid to escape away from the main piston or auxiliary piston connected to it, substantially as described.

In testimony whereof I have hereunto set my hand in presence of two subscribing witnesses.

CHARLES A. MUDGE.

Witnesses:
  WOLDEMAR HAUPT,
  HENRY HASPER.